July 25, 1933.                B. F. FREEMAN                1,919,695
                            RECEPTACLE CLOSURE
                          Filed Nov. 3, 1932            2 Sheets-Sheet 1

July 25, 1933.  B. F. FREEMAN  1,919,695
RECEPTACLE CLOSURE
Filed Nov. 3, 1932  2 Sheets-Sheet 2

INVENTOR
Benjamin F. Freeman
BY
ATTORNEYS

Patented July 25, 1933

1,919,695

UNITED STATES PATENT OFFICE

BENJAMIN F. FREEMAN, OF LONG ISLAND CITY, NEW YORK

RECEPTACLE CLOSURE

Application filed November 3, 1932. Serial No. 641,102.

This invention relates to receptacle closures and has particular reference to a receptacle closure similar to that disclosed in my Patent No. 1,220,085, issued March 20, 1917.

The primary object of the present invention is to provide an improved form of receptacle closure which, when applied to the receptacle and locked thereto, shall be unremovable except by destroying the receptacle.

Another object is to provide an improved form of closure lock which may be easily and quickly applied to the top of the receptacle and which shall automatically lock the top to the receptacle when in position.

A further object is to provide a device of the aforesaid character, which shall be simple in construction, inexpensive to manufacture, and which may be easily and quickly applied.

With the foregoing and other objects in view, the invention may be stated to consist in the various novel features of construction and arrangement or combination, all of which will be fully described hereinafter and pointed out in the appended claims.

In the drawings accompanying and forming a part of this application:

Figure 1:
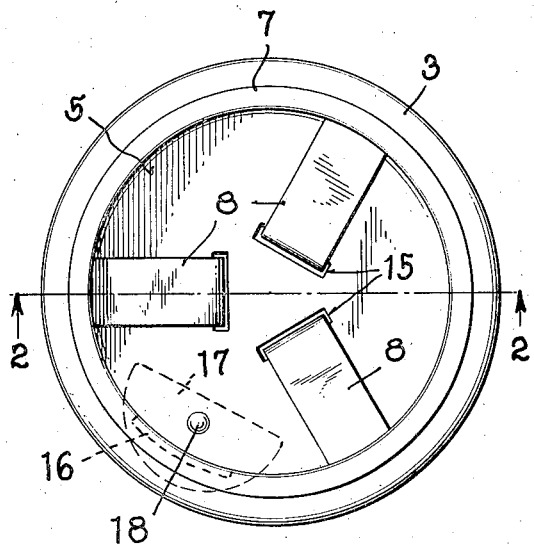
Fig. 1 is a top plan view of a receptacle and closure therefor, showing the same locked thereto.
Figure 3:
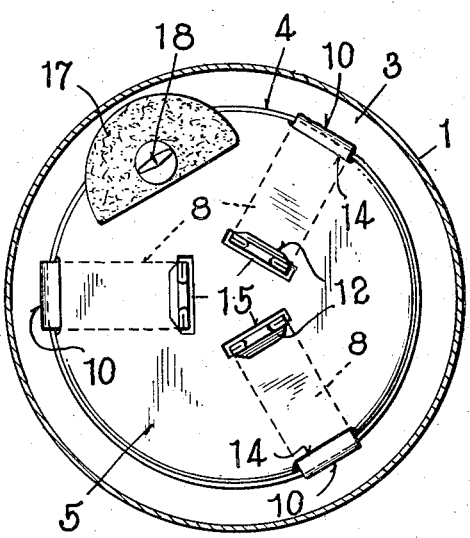
Fig. 3 is a horizontal sectional view taken on the line 3—3 of Fig. 2.

My invention is illustrated as being applied to the ordinary can consisting of a cylindrical body portion 1 having a bottom 2 and a top 3, the latter having an inturned annular flange 4 defining an annular opening. A top 5 having an embossed portion forming a vertical wall 6 is adapted to engage flange 4 and said top is provided with a lateral flange 7 that is adapted to overlie the top surface 3 of the can. The construction thus far described is the standard form of can which is used as a container for canned vegetables, milk, and similar products.

Figure 2:
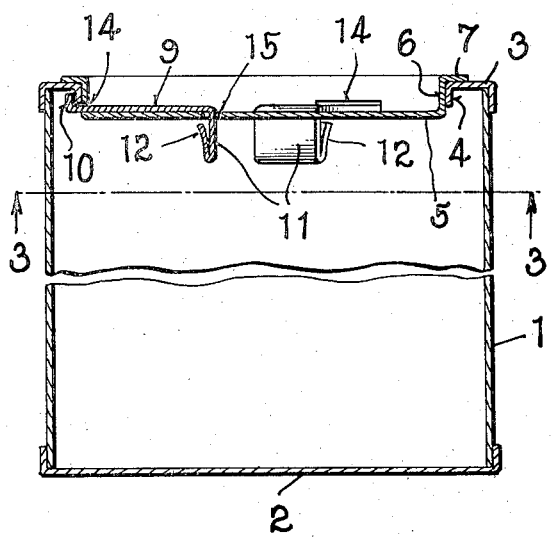
Fig. 2 is a vertical sectional view taken on the line 2—2 of Fig. 1.
Figure 4:
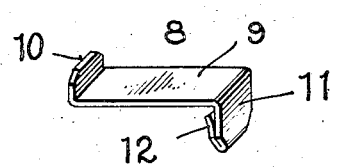
Fig. 4 is a perspective view of one of the locking members.
Figure 5:
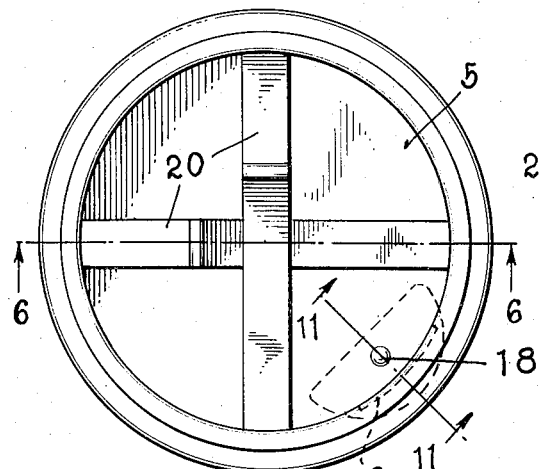
Fig. 5 is a top plan view similar to Fig. 1 but showing a modified form of closure lock.
Figure 7:
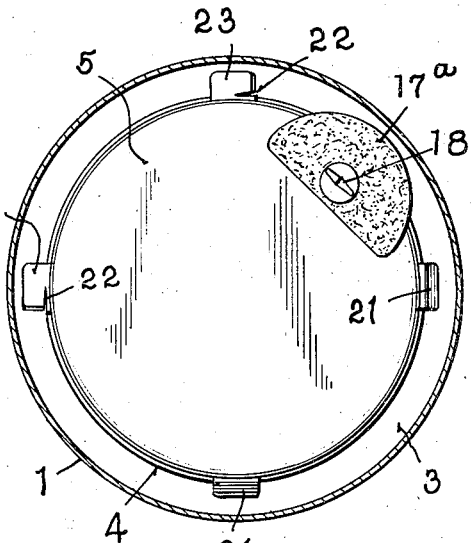
Fig. 7 is a horizontal sectional view taken on the line 7—7 of Fig. 6.
Figure 6:
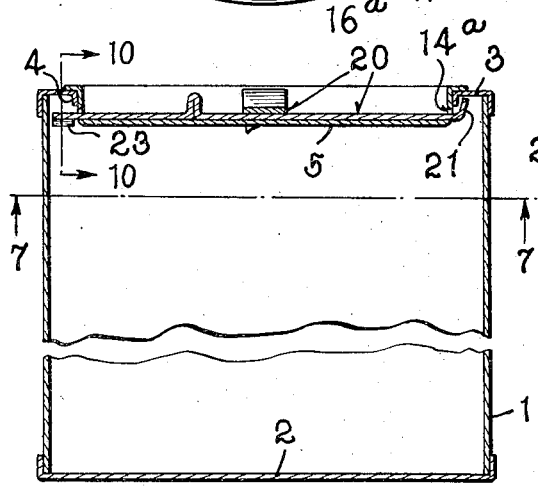
Fig. 6 is a vertical sectional view taken on the line 6—6 of Fig. 5.
Figure 8:
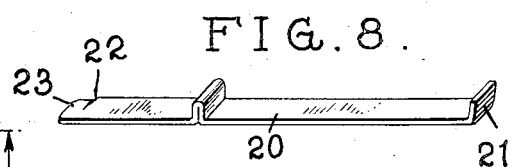
Fig. 8 is a perspective view of one of the locking members.

Referring to Figs. 1–4, my improved lock for locking the top 5 to the body portion of the can comprises a plurality of locking members 8. As shown in Fig. 4, each member 4 consists of a substantially Z-shaped member having a horizontal portion 9, an upwardly turned end 10, and a downwardly turned opposite end 11, the latter being bent upon itself and the end 12 terminating short of the under surface of the portion 9 and slightly spaced from portion 11. These members are each applied to the can by inserting the end 10 through a slot 14 in the vertical walls 6 of the top so as to engage the end beneath flange 4 as shown in Fig. 2. The opposite end portion 11 is then slightly compressed when inserted through a slot 15 in the can top and the end 12 being divergent from the portion 11 and resilient will open when in position to prevent the locking member from being removed. Any desired number of locking members may be employed and in the present instance, I have shown three such members.

I have also illustrated the top 5 as having a coin slot 16 formed in vertical wall 6 so that the can may be used as a toy bank, if desired. In order to prevent the coins from being withdrawn from the bank, I preferably fasten a piece of felted material 17 to the top of the can by a rivet 18, or other suitable fastening device, and this material projects laterally from the under surface of the top 5 and serves as a guard for withdrawal of coins through the slot 16, but is flexible enough to permit insertion of coins through the slot into the can.

It will be noted that the entire locking mechanism is carried by the top and the can body is not altered in any manner. The top, perforated to receive the locking members, can thus be sold separately and used with any container to convert the same into a locked container. The device also may be used as an advertising novelty by producers of canned goods, as the locking top may be cheaply formed from a standard top and supplied as an accessory with the can of goods, so that the can may be readily converted into a bank after the products in the can have been emptied and the can washed. The locked can with or without the coin slot also provides a strong and inexpensive mailing container.

In Figs. 7-11, I have shown a slightly modified form of lock for the can top. In this form of my invention, the locking members 20 are in the form of flat strips (Fig. 8) having one end 21 turned upwardly and the opposite end portion slit transversely at 22 and the end 23 deflected from the horizontal plane of the member. A portion 24 of each locking member intermediate the ends is bent upon itself to form a convenient handle for manipulating the members. The locking members are each applied by inserting the upwardly turned end 21 through a slot 14ª and then forcing the opposite end through a diametrically opposite slot 14ª in the can top, whereupon the deflected end 23 springs into position to engage the top and prevent the removal of the locking member. In the present instance, I have shown two such locking members arranged in crossed relation although it will be understood that one or more such members could be used equally well.

Figure 9:
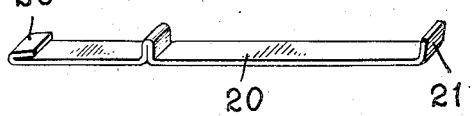
Fig. 9 is a similar view of a slightly modified form of locking member.
Figure 11:
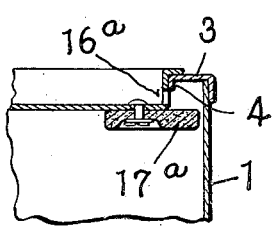
Fig. 11 is a fragmentary vertical sectional view taken on the line 11—11 of Fig. 5.
Figure 10:
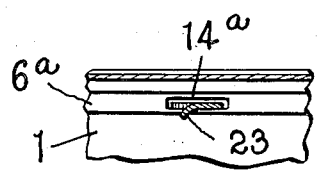
Fig. 10 is a fragmentary vertical sectional view taken on the line 10—10 of Fig. 6.

In Fig. 9, I have shown a slightly modified form of locking member wherein the end 25 is bent upon itself to form a resilient latch. This form of locking member is used in the same manner as previously described in connection with Fig. 8.

The remaining parts of the container and locking cover as shown in Figs. 5-11, inclusive, are similar to those described in connection with Figs. 1-4 inclusive.

What I claim is:

1. The combination with a receptacle provided with an opening and a closure therefor, of a fastening device for locking said closure in its closed position comprising a substantially rigid bar member extending along the exterior of said closure and beyond the same and engaging the inner surface of said receptacle, and additional means formed on said bar member for maintaining said member in locked position.

2. The combination with a receptacle provided with an opening and a closure therefor, of a fastening device for locking said closure in its closed position comprising a substantially rigid bar member extending along the exterior of said closure and beyond the same and engaging the inner surface of said receptacle, and resilient means formed on said bar member and adapted to engage said closure for maintaining said member in locked position.

3. The combination with a receptacle provided with an opening and a closure therefor, of a fastening device for locking said closure in its closed position comprising a substantially rigid bar member extending along the exterior of said closure and beyond the same and engaging the inner surface of said receptacle, said bar having a portion bent to form a resilient latch engageable with the inner surface of said closure to maintain the bar in locked position.

4. The combination with a receptacle provided with an opening and a closure therefor, of a fastening device for locking said closure in its closed position comprising a substantially rigid bar member extending along the exterior of said closure and beyond the same and engaging the inner surface of said receptacle, said bar having a downwardly turned portion extending through said closure, and a resilient latch formed on said downwardly turned portion engageable with the inner surface of said closure to maintain said bar in locked position.

5. The combination with a receptacle provided with an opening and a closure therefor, of a fastening device for locking said closure in its closed position comprising a substantially rigid bar member extending across said closure and having its ends projecting beyond either side thereof and within said receptacle to prevent removal of said closure, one of said ends engaging the inner surface of the receptacle and having a spring like portion engaging the inner surface of the closure to maintain the bar in locked position.

6. The combination of a receptacle provided with a substantially circular opening, the edge wall of which is spaced inwardly from the lateral edge of the receptacle, a closure therefor having a rim adapted to overlap the edge wall of said opening and an annular wall arranged to extend into the interior space of said receptacle, said annular wall of the closure being perforated, a fastening bar having one end extending through said perforation to engage said receptacle rim, the opposite end of said bar extending through a perforation in said closure, and a latch formed on the last mentioned end of said bar and engageable with the inner surface of said closure to maintain said bar in position.

7. The combination with a receptacle provided with an opening and a closure therefor, of a fastening device for locking said closure in its closed position comprising a substantially rigid bar member adjustable with respect to said closure, extending over the surface of said closure and beyond the same and engaging the inner surface of said receptacle, said bar having a portion bent to form a resilient latch within said receptacle and accessible for release only from the interior of said receptacle, thus to maintain the bar in locked position with respect to said closure.

8. The combination of a receptacle provided with an opening, the edge wall of which is spaced inwardly from the lateral edge of the receptacle, a closure therefor having a rim adapted to overlap the edge wall of said opening and an annular wall arranged to extend into said opening and into the interior space of said receptacle, said annular wall of the closure being perforated, a fastening bar having one end extending through said perforation to engage said receptacle rim, the opposite end of said bar extending through a perforation in said closure and both ends of said bar lying within the interior of said receptacle, and a spring latch on one end of said bar adapted to pass through its respective perforation when in deformed condition and adapted to spring into normal position within the interior of said receptacle to maintain said bar in the locking position and prevent removal of said closure.

BENJAMIN F. FREEMAN.